US007287155B2

(12) United States Patent
Fujii et al.

(10) Patent No.: US 7,287,155 B2
(45) Date of Patent: Oct. 23, 2007

(54) STORAGE CONTROL SYSTEM AND BOOT CONTROL SYSTEM

(75) Inventors: Masanori Fujii, Odawara (JP); Yasuo Inoue, Odawara (JP); Nobuyuki Minowa, Ooi (JP)

(73) Assignee: Hitachi, Ltd., Tokyo (JP)

( * ) Notice: Subject to any disclaimer, the term of this patent is extended or adjusted under 35 U.S.C. 154(b) by 420 days.

(21) Appl. No.: 10/878,284

(22) Filed: Jun. 29, 2004

(65) Prior Publication Data

US 2005/0235138 A1    Oct. 20, 2005

(30) Foreign Application Priority Data

Apr. 19, 2004   (JP) .............................. 2004-122739

(51) Int. Cl.
*G06F 9/00* (2006.01)
*G06F 11/00* (2006.01)

(52) U.S. Cl. .............................. 713/2; 713/1; 713/300; 714/48

(58) Field of Classification Search .................... 713/2, 713/1; 714/6, 36, 42, 48; 395/651
See application file for complete search history.

(56) References Cited

U.S. PATENT DOCUMENTS

| 3,972,033 | A | * | 7/1976 | Cislaghi et al. ............. 365/202 |
| 5,797,023 | A | | 8/1998 | Berman et al. ........ 395/750.06 |
| 5,832,005 | A | | 11/1998 | Singh ........................ 371/51.1 |
| 5,938,774 | A | | 8/1999 | Hsu .............................. 714/6 |
| 6,571,347 | B1 | | 5/2003 | Tseng ............................ 714/6 |
| 6,625,730 | B1 | | 9/2003 | Angelo et al. ................ 713/2 |
| 6,631,493 | B2 | * | 10/2003 | Ottesen et al. .............. 714/774 |
| 6,792,556 | B1 | | 9/2004 | Dennis .......................... 714/6 |
| 7,017,017 | B2 | * | 3/2006 | Dahlen et al. .............. 711/157 |
| 7,062,618 | B2 | * | 6/2006 | Tsunoda et al. ............ 711/154 |
| 2002/0078314 | A1 | * | 6/2002 | Hornung et al. ............ 711/154 |
| 2003/0120912 | A1 | | 6/2003 | Sasaki et al. ................ 713/2 |
| 2003/0229777 | A1 | | 12/2003 | Morals et al. ................. 713/2 |
| 2004/0153724 | A1 | | 8/2004 | Nicholson et al. ............. 714/6 |
| 2005/0055598 | A1 | | 3/2005 | Chen et al. .................... 714/2 |

FOREIGN PATENT DOCUMENTS

| JP | 2001109629 | 4/2001 |
| JP | 2003196097 | 7/2003 |
| JP | 200413905 | 1/2004 |

* cited by examiner

*Primary Examiner*—Chun Cao
*Assistant Examiner*—Brian Bochicco
(74) *Attorney, Agent, or Firm*—Mattingly, Stanger, Malur & Brundidge, P.C.

(57) ABSTRACT

A PLD is interposed on the communication route between a microprocessor (hereinbelow called MP) and boot memories. The boot memories store MP start-up data needed to start up the MP and start-up protection code constituting protection code for the MP start-up data. The PLD reads the MP start-up data and the start-up protection code thereof from the boot memories, performs, in hardware fashion, a check of the validity of the MP start-up data using this start-up protection code and, if a negative check result is obtained, resets the MP and if a positive check result is obtained, inputs the start-up data that is thus read to the MP.

6 Claims, 7 Drawing Sheets

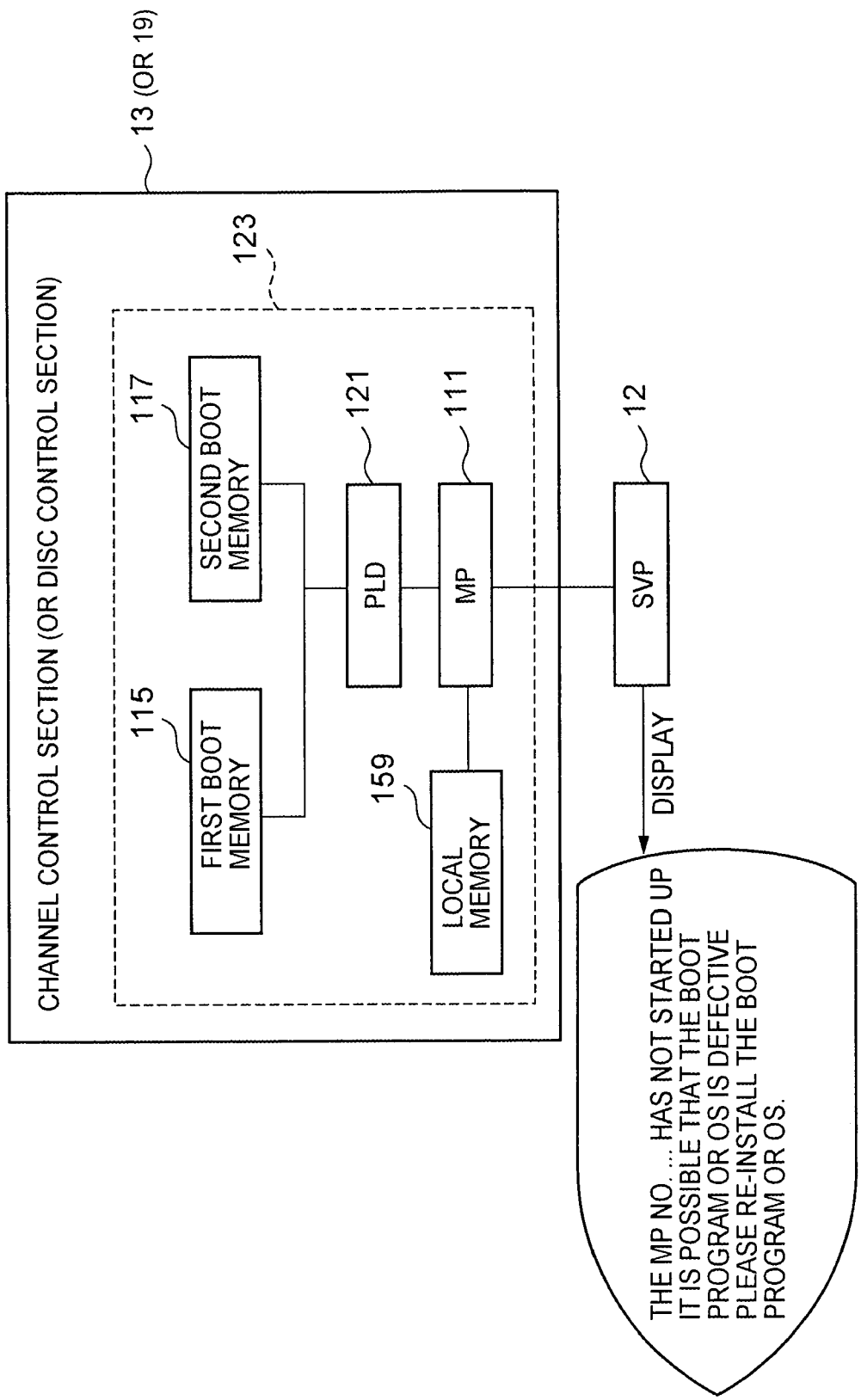

STORAGE CONTROL SYSTEM AND BOOT CONTROL SYSTEM

CROSS-REFERENCE TO PRIOR APPLICATION

This application relates to and claims priority from Japanese Patent Application No. 2004-122739, filed on Apr. 19, 2004, the entire disclosure of which is incorporated herein by reference.

BACKGROUND OF THE INVENTION

1. Field of the Invention

The present invention relates to a memory control system and to a technique for controlling booting of a processor.

2. Description of the Related Art

Techniques for protection of data read by a processor include for example the techniques disclosed in Laid-open Japanese Patent Application No. 2001-109629, Laid-open Japanese Patent Application No. 2003-196097 and Japanese Patent Application No. 2004-13905.

Laid-open Japanese Patent Application No. 2001-109629 discloses the preparation of two boot programs that are used by a processor; if normal start-up is not achieved by reading one of these boot programs, the other boot program is read.

Laid-open Japanese Patent Application No. 2003-196097 discloses that, in addition to the instructions, the boot ROM stores the expected value of the checksum of the instructions, a DSP (digital signal processor) reads the instructions in the boot ROM and writes these into instruction memory and then performs a checksum, using the expected value of the checksum in the boot ROM, on the instructions that have thus been read into the instruction memory.

Laid-open Japanese Patent Application No. 2004-13905 discloses a technique relating to code protection in the boot program.

Typically, when a processor performs processing for start-up, first of all, initialization is conducted by resetting the register values of the processor. Next, the processor reads the boot program from memory such as ROM (hereinbelow referred to for convenience in description as "boot memory"), expands the boot program which has thus been read into local memory that is connected with the processor, and, in accordance with this boot program which has thus been expanded into the local memory, reads the OS (operating system) from the boot memory and expands it into the local memory. In this way, the processor is started up.

With this arrangement, there is a possibility that, if there is an error in the data code constituting the boot program or OS that is read by the processor and for example written to the registers, the processor may start up using this spurious data code, resulting in the processor hanging up (for example performing other processing than the processing which ought to be performed). The possibility of this is further increased in cases where for example an updated OS version is overwritten onto the boot memory and, due to for example some failure in overwriting, spurious data codes are written to the boot memory.

SUMMARY OF THE INVENTION

An object of the present invention is therefore to ensure that, in the processing prior to starting up of the processor, spurious data codes are not read by the processor.

Further objects of the present invention will become clear from the following description.

A storage control system according to a first aspect of the present invention comprises a plurality of storage devices that store data, a cache memory that temporarily stores data that is exchanged between said storage device (specifically, a storage device selected from the plurality of storage devices) and an external device, and a control device that controls the exchange of data performed between said storage device and said external device through said cache memory. Said control device may comprise a processor, a start-up memory region and data checking hardware. Said processor may control said exchange. Start-up data required for starting up said processor and start-up protection code constituting protection code for said start-up data may be stored in said start-up memory region. Said data checking hardware may read said start-up data and the start-up protection code thereof from said start-up memory region, perform a validity check on at least one of said start-up protection code and said start-up data, and, if a negative check result is obtained, reset said processor and, if a positive check result is obtained, input said start-up data that is thus read to said processor.

The "start-up data" may consist for example of the boot program of the OS of the processor and constituent elements of the OS itself that are read in accordance with this boot program. Also, the "start-up protection code" may consist for example of parity or ECC (Error Correcting Code).

Also, the "validity check on at least one of said start-up protection code and said start-up data" may be at least one of a check of validity of the start-up data using for example the start-up protection code and a check of validity of the start-up protection code, using the start-up data.

In a first preferred embodiment according to the first aspect of the present invention, said data checking hardware may generate said start-up protection code on receiving the start-up data from said processor and store said start-up data and said start-up protection data in said start-up memory region.

In a second preferred embodiment according to the first aspect of the present invention, said start-up data may comprise a start-up data most significant element constituting the element on the most significant side of said start-up data and a start-up data least significant element constituting the element on the least significant side of said start-up data. Said start-up protection code may include start-up most significant protection code constituting the protection code of the most significant element of said start-up data and start-up least significant protection code constituting the protection code of the least significant element of said start-up data. Said start-up memory region may comprise a first start-up sub-memory region and a second start-up sub-memory region. Said first start-up sub-memory region may store said start-up data most significant element and said start-up data least significant protection code. Said second start-up sub-memory region may store said start-up data least significant element and said start-upmost significant protection code. Said data checking hardware reads said start-up least significant protection code and said start-up data most significant element from said first start-up sub-memory region, reads said start-up most significant protection code and said start-up data least significant element from said second start-up sub-memory region, performs a first sub-check that checks the validity of at least one of said start-up most significant protection code and said start-up data most significant element and a second sub-check that checks the validity of at least one of said start-up least significant protection code and said start-up data least significant element and, if a negative check result is obtained in at least one of said first sub-check and said second sub-check, resets said processor and, if a positive check result is obtained in both of said first sub-check and said second sub-check, inputs said start-up data most significant element and said start-up data least significant element to said processor.

In a third preferred embodiment according to the first aspect of the present invention, in said second preferred embodiment, said data checking hardware comprises a sub-dividing circuit that subdivides the start-up data received from said processor into said start-up data most significant elements and said start-up data least significant elements, a protection code generating circuit that generates said start-up most significant protection code using said start-up data most significant elements and generates said start-up least significant protection code using said start-up data least significant elements, and a data storage circuit that stores said start-up data most significant elements and said start-up data least significant protection code in said first start-up sub-memory region and that stores said start-up data least significant elements and said start-upmost significant protection code-in said second start-up sub-memory region.

A boot control system according to a second aspect of the present invention comprises a processor, a start-up memory region, and data checking hardware. Said start-up memory region stores start-up data required for starting up said processor and a start-up memory region that stores start-up protection code constituting protection code for said start-up data. Said data checking hardware, in response to a request from said processor, reads said start-up data and the start-up protection code thereof from said start-up memory region and performs validity checking of at least one of said start-up protection code and said start-up data and, if a negative check result is obtained, resets said processor and, if a positive check result is obtained, inputs said start-up data to said processor.

This boot control system may be incorporated in various types of electronic equipment comprising a processor.

A processor chip according to a third aspect of the present invention comprises a processor core, a start-up memory region and data checking hardware. Said start-up memory region stores the start-up data required for starting up said processor core and start-up protection code constituting protection code for said start-up data. Said data checking hardware, in response to a request from said processor core, reads said start-up data and the start-up protection code thereof from said start-up memory region and performs validity checking of at least one of said start-up protection code and said start-up data and, if a negative check result is obtained, resets said processor core and, if a positive check result is obtained, inputs said start-up data to said processor core.

A boot control method according to a fourth aspect of the present invention comprises a step of generating start-up protection code constituting protection code for the start-up data of a processor, a step of storing said start-up data and said start-up protection data in a start-up memory region, a step of reading said start-up data and the start-up protection code thereof from said start-up memory region in response to a request from the processor core, a step of performing a validity check on at least one of said start-up protection code and said start-up data that have thus been read, a step of resetting said processor core if a negative check result was obtained and a step of inputting said start-up data to said processor if a positive check result was obtained.

BRIEF DESCRIPTION OF THE DRAWINGS

FIG. 7 is a view given in explanation of a second modified example of an embodiment of the present invention.

DESCRIPTION OF THE PREFERRED EMBODIMENTS

An embodiment of the present invention is described below with reference to the drawings, taking as an example the case where a boot control system according to an embodiment of the present invention is applied to a storage control system.

Figure 1:
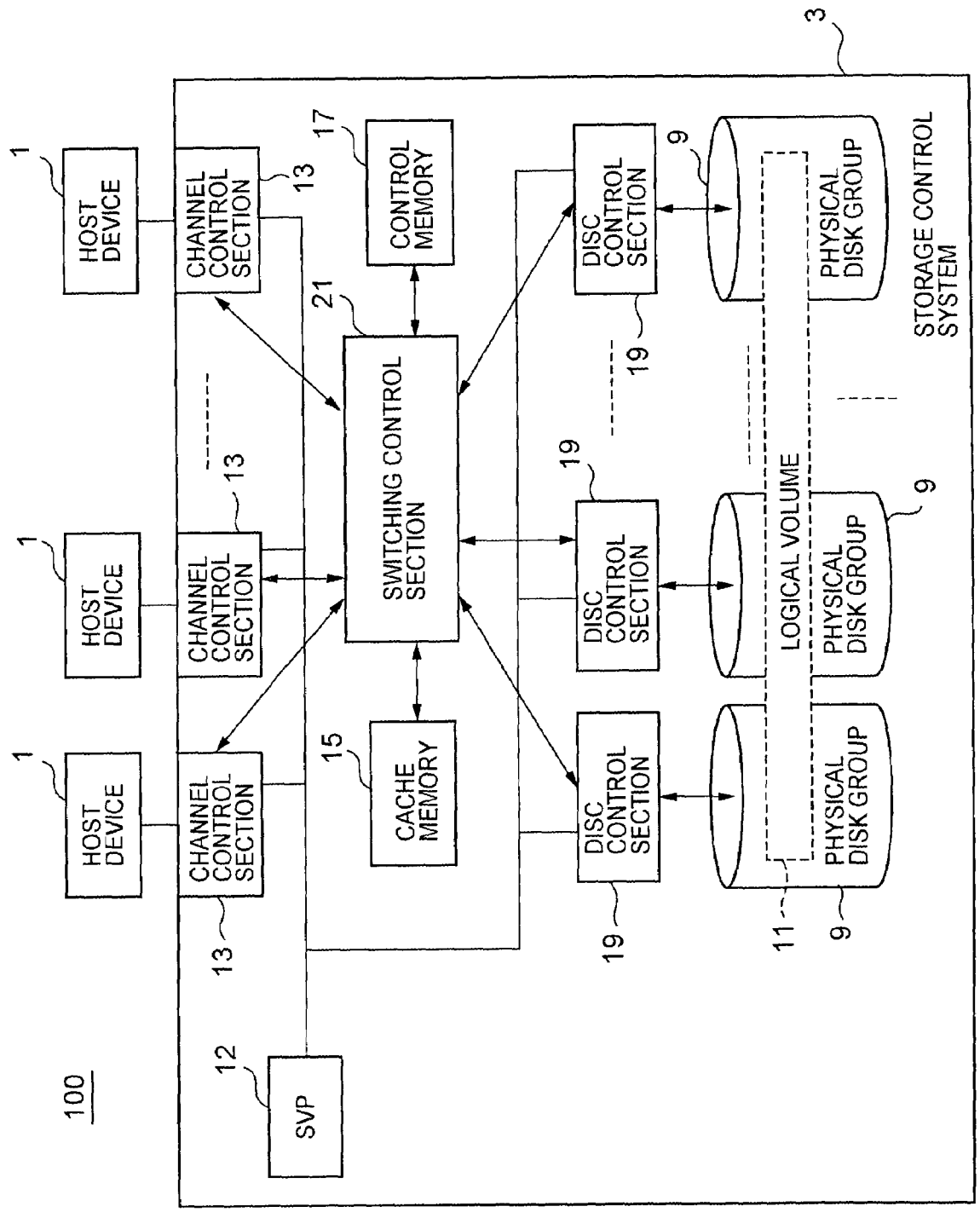
FIG. 1 is a view showing the overall layout of a computer system comprising a storage control system according to an embodiment of the present invention.

FIG. 1 shows the overall layout of a computer system comprising a storage control system according to an embodiment of the present invention.

This computer system 100 comprises a storage control system 3 and one or a plurality of host devices 1 connected with this storage control system 3.

A host device 1 may be for example a personal computer or workstation and constitutes a computer system comprising for example a CPU (central processing unit) and memory. Various functions may be implemented by running various types of program by the CPU of the host device 1. The host device 1 is connected with the storage control system 3 through a communication network such as for example a LAN.

The storage control system 3 is for example a RAID (Redundant Array of Independent Inexpensive discs) system having one or more physical disc groups 9 comprising a plurality of disc storage devices arranged in an array. The storage control system 3 comprises one or a plurality of channel control sections 13, a cache memory 15, a control memory 17, one or more physical disc groups 9, one or more disc control sections 19, a switching control section 21 and an SVP (Service Processor) 12.

The channel control sections 13 are connected with host devices 1. The channel control sections 13 may be constituted by a hardware circuit, software, or a combination of these, and effect data communication between this storage control system 3 and host devices 1 that are connected therewith. The channel control sections 13 comprise a communication interface for performing communication with host devices 1 that are connected therewith and also comprise a processor for performing processing by interpreting various types of command received from the host devices 1. The channel control sections 13 read data stored in the cache memory 15 and transmit this to the host devices 1 after referring to information registered in the control memory 17, and store data received from the host devices 1 and that is to be written, in the cache memory 15.

The cache memory 15 is a memory shared by the channel control sections 13 and the disc control sections 19. The cache memory 15 temporarily stores data that is exchanged between the channel control sections 13 and the disc control sections 19.

The control memory 17 is also a memory that is shared by the channel control sections 13 and disc control sections 19. In the control memory 17, data from the host devices 1 are written to logical volumes 11, to be described, and control information relating for example to transmission of data that is read therefrom from the logical volumes 11 to the host devices 1 is registered.

Each physical disc group 9 is constituted by arranging a plurality of disc storage devices in an array. Various types of device such as for example hard disc devices, floppy disc devices, or semiconductor storage devices may be employed as the disc storage devices constituting the physical disc groups 9. A plurality of logical volumes 11 constituting logical storage regions are set up on the physical storage region provided by the one or more physical disc groups 9.

The disc control sections 19 are provided for example for each of the physical disc groups 9 and control prescribed physical disc groups 9. The disc control sections 19 may be constituted by hardware circuits, software or a combination of these. For example, the disc control sections 19 perform reading or writing of data in respect of a logical volume selected from the plurality of logical volumes 11 in accordance with control information recorded in the control memory 17. Also, the disc control sections 19 convert data access requests in respect of logical volumes 11 into data access requests to physical discs by converting logical addresses into physical addresses.

The switching control section 21 may be constituted as a high-speed bus switch such as for example a very high-speed cross bus switch that performs data transfer using a high-speed switching action. The switching control section 21 is capable of mutual communication with the channel control sections 13, the disc control sections 19, control memory 17 and cache memory 15. Exchange of data or commands between these channel control sections 13, the disc control sections 19, control memory 17 and cache memory 15 is performed through the switching control section 21.

The SVP 12 is an information processing terminal (for example a notebook personal computer). The SVP 12 is connected with a microprocessor, not shown, in each channel control section 13 and each disc control section 19, by means of a communication network (for example a LAN). The SVP 12 displays information received from the microprocessor on its display screen.

The above is an outline of a computer system 100 according to this embodiment. This computer system 100 may be directly connected with the disc control sections 19 and physical disc groups 9 or may be indirectly connected by means of a network. Also, the physical disc groups 9 and disc control sections 19 may be integrally constructed. A single logical volume 11 may be respectively allocated to each channel control section 13 or a single logical volume 11 may be shared by a plurality of channel control sections 13.

As mentioned above, although not shown in FIG. 1, one or more microprocessors (hereinbelow referred to as MPs) may be provided in the channel control sections 13 and disc control sections 19. The one or more microprocessors control the operation of the channel control sections 13 or disc control sections 19 where these are provided. In mis embodiment, a boot control system is provided that is so constructed that spurious data code cannot be read by the channel control sections 13 and disc control sections 19 prior to start-up of the incorporated MP. This boot control system is described below.

Figure 2:
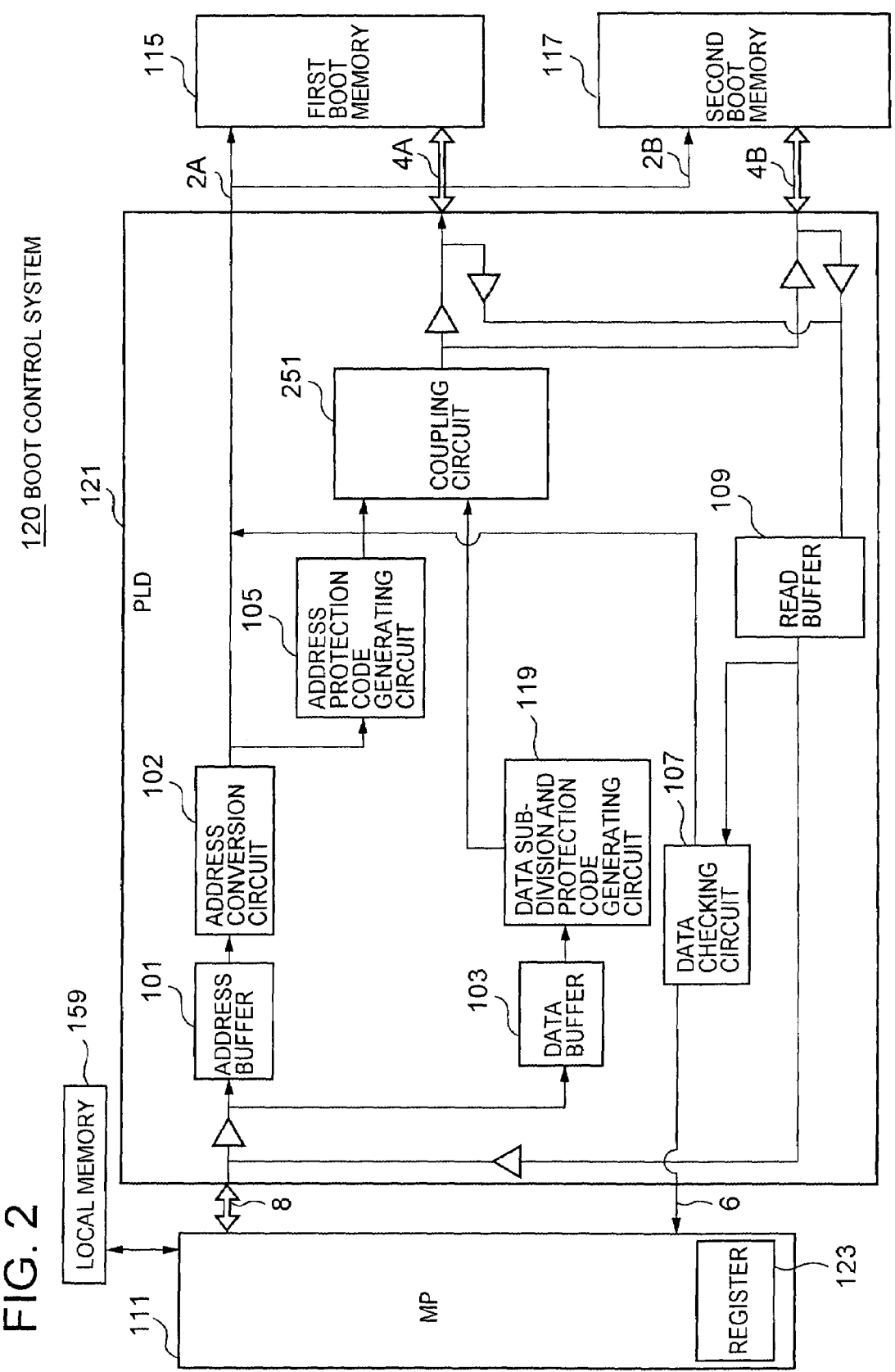
FIG. 2 is a view showing an example of the layout of a boot control system.
Figure 3:
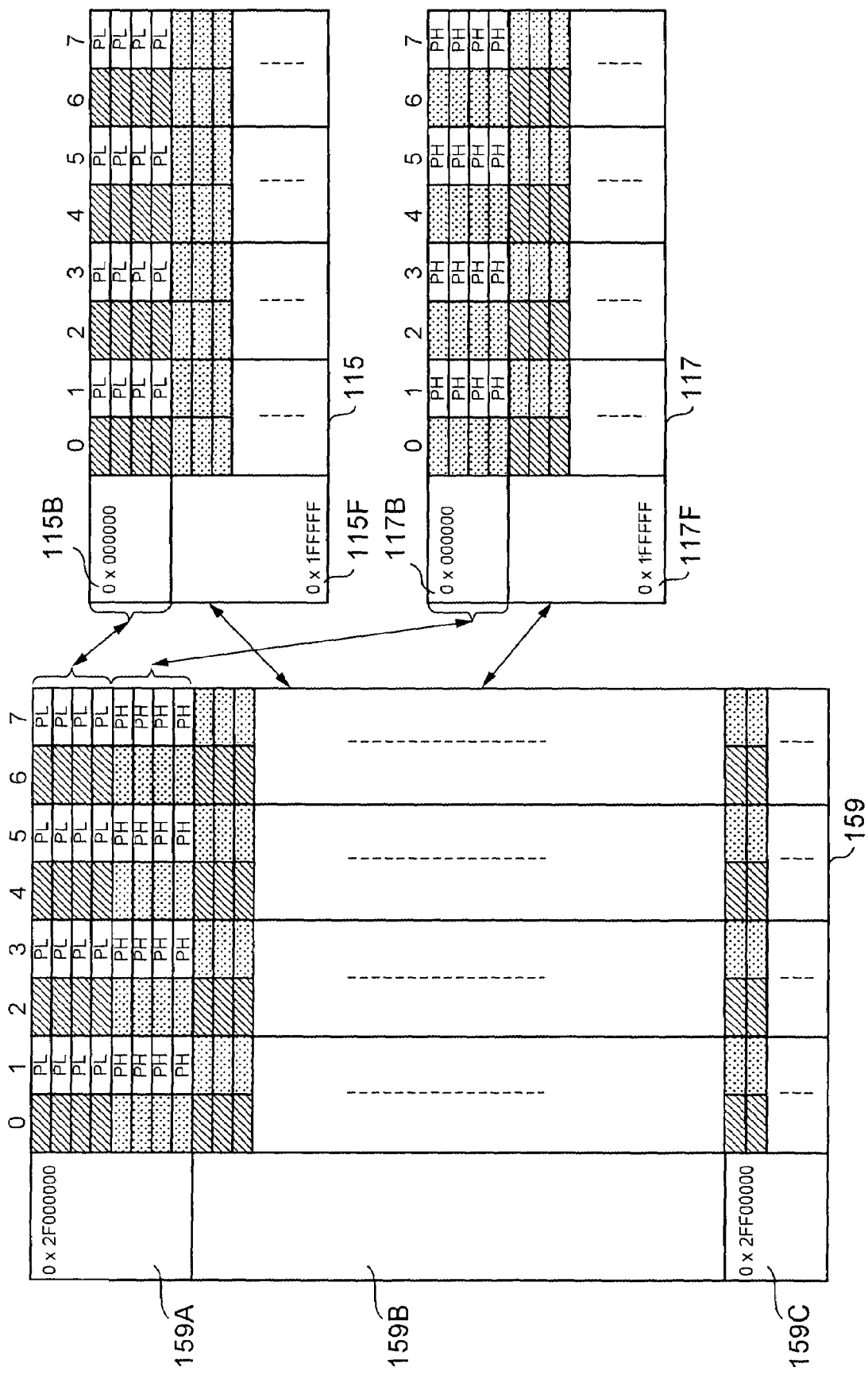
FIG. 3 is a view showing the data structure in the two boot memories 115 and 117 employed by an MP provided in the boot control system and in the local memory of this MP.

FIG. 2 shows an example of the construction of a boot control system. FIG. 3 shows the data structures in the two boot memories 115 and 117 employed by the MP provided in this boot control system and in the local memory of this MP. It should be noted that, in the following description, the data that is exchanged between the boot memories 115, 117 and the MP 111 is termed the "MP data" in order to differentiate it from the data that is exchanged between the host device 1 and the storage control system 3.

As shown in FIG. 2, the boot control system 120 according to this embodiment includes a first boot memory 115, second boot memory 117, local memory 159, MP 111 and PLD (Programmable Logic Device) 121.

The first boot memory 115 and the second boot memory 117 are respectively for example 8-byte non-volatile memories (for example ROM or flash ROM). The first boot memory 115 comprises a plurality of memory spaces, for example a first direct execution space 115B and a first file space 115F. Likewise, the second boot memory 117 comprises a plurality of memory spaces, for example a second direct execution space 117B and a second file space 117F.

The direct execution spaces 115B and 117B are memory spaces that store the required MP data (hereinbelow referred to as start-up MP data) that is read by the MP111 in order to start up the OS of the MP 111 (in other words, up to when the OS starts) Specifically, in the first direct execution space 115B, there are for example alternately adjacently arranged for example one-byte start-up MP data most significant elements (hereinbelow referred to as "start-up DHs") and one-byte least significant protection data (hereinbelow referred to as "PLs"). In the second direct execution space 117B, there are for example alternately adjacently arranged for example one-byte start-up MP data least significant elements (hereinbelow referred to as "start-up DLs") and one-byte most significant protection data (hereinbelow referred to as "PHs").

The start-up DHs are MP data element on the most significant side of the start-up MP data and the start-up DLs are MP data element on the least significant side of the start-up MP data. The data sizes of the start-up DHs and start-up DLs may be the same or different. The start-up MP data (for example two-byte data) is subdivided into the start-up DHs (for example one-byte data) and the start-up DLs (for example one-byte data). Incidentally, the start-up MP data is a constituent element of at least one of for example the boot program of the MP 111 or the OS that is read in accordance with this boot program.

Also, the PHs are MP data including the start-up most significant protection code constituting protection code for the start-up DHs, the first address in the first boot memory 115 of the start-up DHs and, of the first address protection code constituting protection code for this first address, at least the start-up most significant protection code. Likewise, the PLs are MP data including the start-up least significant protection code constituting protection code for the start-up DLs, the second address in the second boot memory 117 of the start-up DLs and, of the second address protection code constituting protection code for this second address, at least the start-up least significant protection code. The protection code may be for example parity or ECC (error correcting code).

As will be understood from this description and FIG. 3, the first direct execution space 115B stores a single PL in respect of a single start-up DH. Likewise, the second direct execution space 117B stores a single PH in respect of a single start-up DL.

The file spaces 115F and 117F are memory spaces in which the MP data employed by the OS (hereinbelow called MP data for the OS) is stored after start-up of the OS of the MP 111. The MP data for the OS comprises for example two-byte data. In FIG. 3, the most significant bytes of the start-up MP data and OS data are indicated by hatching and the least significant bytes are indicated by a reticulate pattern of dots. The file spaces 115F and 117F may store the expected values of the checksum in respect of the various items of MP data for the OS. Also, at least one of the first direct execution space 115B and first file space 115F and/or at least one of the second direct execution space 117B and second file space 117F may be variable (for example the MP 111 may adjust the capacities of the respective spaces in accordance with a user request). Also, the direct execution spaces 115B, 117B may be provided on a first sub-memory (for example DRAM) and the file spaces 115F, 117F may be provided on a second sub-memory, separate from the first sub-memory (for example SRAM)

The above is a description of the first boot memory 115 and second boot memory 117. It should be noted that it is not essential that the first boot memory 115 and the second boot memory 117 should be provided in separate memories; for example a first memory space corresponding to the first boot memory 115 and a second memory space corresponding to the second boot memory 117 could be provided on the same memory. Also, the first boot memory 115 and the second boot memory 117 could be provided for each MP, or could be shared by a plurality of MPs.

The local memory 159 is employed by the MP 111 for example as a work region of the MP 111 or a reception buffer region in which the data received from outside this boot control system 120 (for example from a host device 1 or a logical volume 11) is temporarily accumulated. The start-up MP data and MP data for the OS that are read by the MP 111 from the first boot memory 115 and the second boot memory 117 are expanded into the local memory 159. An example of the result of this expansion is shown in FIG. 3. Specifically, into a first prescribed region 159A of the local memory 159, there are expanded the start-up DH and PL that are read from the first direct execution space 115B and the start-up DL and PH that are read from the second direct execution space 115F. Also, into a second prescribed region 159B of the local memory 159, there are expanded the MP data for the OS that is read from the first file space 115F and the MP data for the OS that is read from the second file space 117F.

The MP 111 shown in FIG. 2 controls the operation of the channel control section 13 or the disc control section 19 In which this MP 111 is incorporated. If for example the MP 111 Is incorporated in a channel control section 13, the MP 111 for example reads received data from a host device 1 into the cache memory 15 and the disc control section 19 reads data that has been written to the cache memory 15 and transmits this data to a host device 1. Also, if the MP 111 is incorporated in a disc control section 19, the MP 111 for example writes data that has been read from a logical volume 11 to the cache memory 15 and data written in the cache memory 15 is read by a channel control section 13 and stored in a logical volume 11. With such an MP 111, when the MP data is read, the original address for reading registered beforehand in a register 123 of the MP 111 is output to a PLD 121 and, in accordance therewith, if a data pair is received from the boot memories 115,117, this data pair is expanded into the first prescribed region 159A of the local memory 159. Also, the MP 111 outputs to the PLD 121 the start-up MP data and the original address for storage that displays the storage destination thereof. It should be noted that the "original address" is the address managed by the MP 111 and is different from the addresses of the boot memories 115 and 117 The first address, which is the address of the first boot memory 115 and the second address, which is the address of the second boot memory 117, are generated by the PLD 121 from the original address. Hereinbelow, when the original address for reading and the address for storage are referred to generally, they will simply be termed "original addresses".

The PLD 121 is for example a pure hardware circuit that is interposed on the communication route between the MP 111 and the first boot memory 115 and second boot memory 117. The PLD 121 comprises an address buffer 101, address conversion circuit 102, read buffer 109, data check circuit 107, address protection code generating circuit 105, data buffer 103, sub-division protection generating circuit 119$^i$ and coupling circuit 251.

The address buffer 101 is a buffer that temporarily accumulates original addresses that are input through the data input/output line 8 from the MP 111.

The address conversion circuit 102 acquires original addresses from the address buffer 101 and, using these original addresses, generates a first address (i.e. address in the first boot memory 115) and a second address i.e. address in the second boot memory 117). The address conversion circuit 102 determines beforehand the rule whereby an original address that is received is used to generate a first address and a second address and outputs the first address and second address that are generated in accordance with this rule. The first address that is output is input to the first boot memory 115 through a first address line 2A and the second address is input to the second boot memory 117 through a second address line 2B. Also, the first address and the second address are input to the address protection code generating circuit 105. It should be noted that the first address includes for example a first sub-address for reading or writing the one-byte start-up DH and a second sub-address for reading or writing the one-byte PL. Also, the second address includes for example a third sub-address for reading or writing the one-byte start-up DL and a fourth sub-address for reading or writing the one-byte PH.

When the first address that was input to the first boot memory 115 is generated based on the original address for reading, the MP data that is present at the first address of the first boot memory 115 is output to the PLD 121 through a first data line 4A. Also, when the second address that was input to the second boot memory 117 is generated based on the original address for reading, the MP data that is present at the second address of the second boot memory 117 is output to the PLD 121 through a second data line 4B. The MP data that was output respectively through the first data line 4A and the second data line 4B is temporarily stored in the read buffer 109. It should be noted that, prior to start-up of the MP 111, the start-up DH and PL and the start-up DL and PH are read to the read buffer 109. The start-up DH and start-up DL that are then read are constituent elements of the same MP data. In other words, when for example a given start-up DH and PL pair are read, a pair comprising another start-up DL that does not constitute the same MP data as the start-up DH is not read, but a start-up DL that constitutes the same MP data as this start-up DH is read. This is because the first address and the second address that are generated by the address conversion circuit 102 constitute the content that is thus read.

The data check circuit 107 performs a data check using the start-up DH and PL and the start-up DL and PH in the read buffer 109. For example, the data check circuit 107 performs a first check which is a check of the validity of at least one of the start-up DH and PH and a second check which is a check of the validity of at least one of the start-up DL and PL. Specifically, in for example the first check, the data checking circuit 107 checks the validity of the start-up DH using the start-up most significant protection code contained in the PH and, in the second check, checks the validity of the start-up DL using the start-up least significant protection code contained in the PL. If the data checking circuit 107 obtains a positive check result in both the first check and the second check, the data checking circuit 107 inputs the start-up DH and PL and the start-up DL and PH in the read buffer 109 to the MP 111 through a data input/output line 8. Contrariwise, if the data checking circuit 107 obtains a negative check result in at least one of the first check and the second check, it executes prescribed error processing so that neither the start-up DH and PL nor the start-up DL and PH are output to the MP 111. The error processing may comprise for example that the data checking circuit 107 outputs the first address and the second address contained in the PH and PL to the first boot memory 115 and second boot memory 117, reads the same start-up DH and PL and start-up DL and PH to the read buffer 109 and again performs the first check and second check. Also, the error processing may comprise for example that the data checking circuit 107 resets the MP 111 by using a reset signal line 6. It should be noted that the data checking circuit 121 need not necessarily always perform the first and second checks but could for example perform error processing without performing the second check in cases where a negative check result is obtained by the first check.

The data buffer 103 is a buffer that temporarily accumulates start-up MP data that is input from the MP 111 through the data input/output line 8.

The sub-division protection generating circuit 119 subdivides the start-up MP data in the data buffer 103 into a start-up DH and start-up DL. Also, the start-up protection generating circuit 119 generates start-up most significant protection code based on the start-up DH obtained by the sub-division and generates start-up least significant protection code based on the start-up DL obtained by the sub-division. The sub-division protection generating circuit 119 generates and outputs the start-up DH, start-up DL, start-up most significant protection code and start-up least significant protection code.

The address protection code generating circuit 105 generates a first address protection code based on the first address from the address conversion circuit 102 and generates a second address protection code based on the second address. The address protection code generating circuit 105 outputs the first address and second address from the address conversion circuit 102 with the first address protection code and second address protection code that have thus been generated.

A coupling circuit 251 generates a PH by coupling the first address protection code from the address protection code generating circuit 105, first address and start-up most significant protection code, and outputs this PH, a start-up DL selected from the start-up DHs and the start-up DLs from the sub-division protection generating circuit 119 to the second boot memory 117 through the second data line 4B. In this way, the start-up DL and PH are written in the location indicated by the second address that is input to the second boot memory 117 through the second address line 2B from the address conversion circuit 102. Also, the coupling circuit 251 generates a PL by coupling the second address protection code, from the address protection code generating circuit 105, the second address and the start-up least significant protection code and outputs this PL and a start-up DH selected from the start-up DHs and start-up DLs from the sub-division protection generating circuit 119 to the first boot memory 115 through the first data line 4A. In this way, the start-up DH and PL are written in the location indicated by the first address that is input to the first boot memory 115 through the first address line 2A from the address conversion circuit 102.

The process flow performed in this boot control system 120 is described below.

Figure 4:
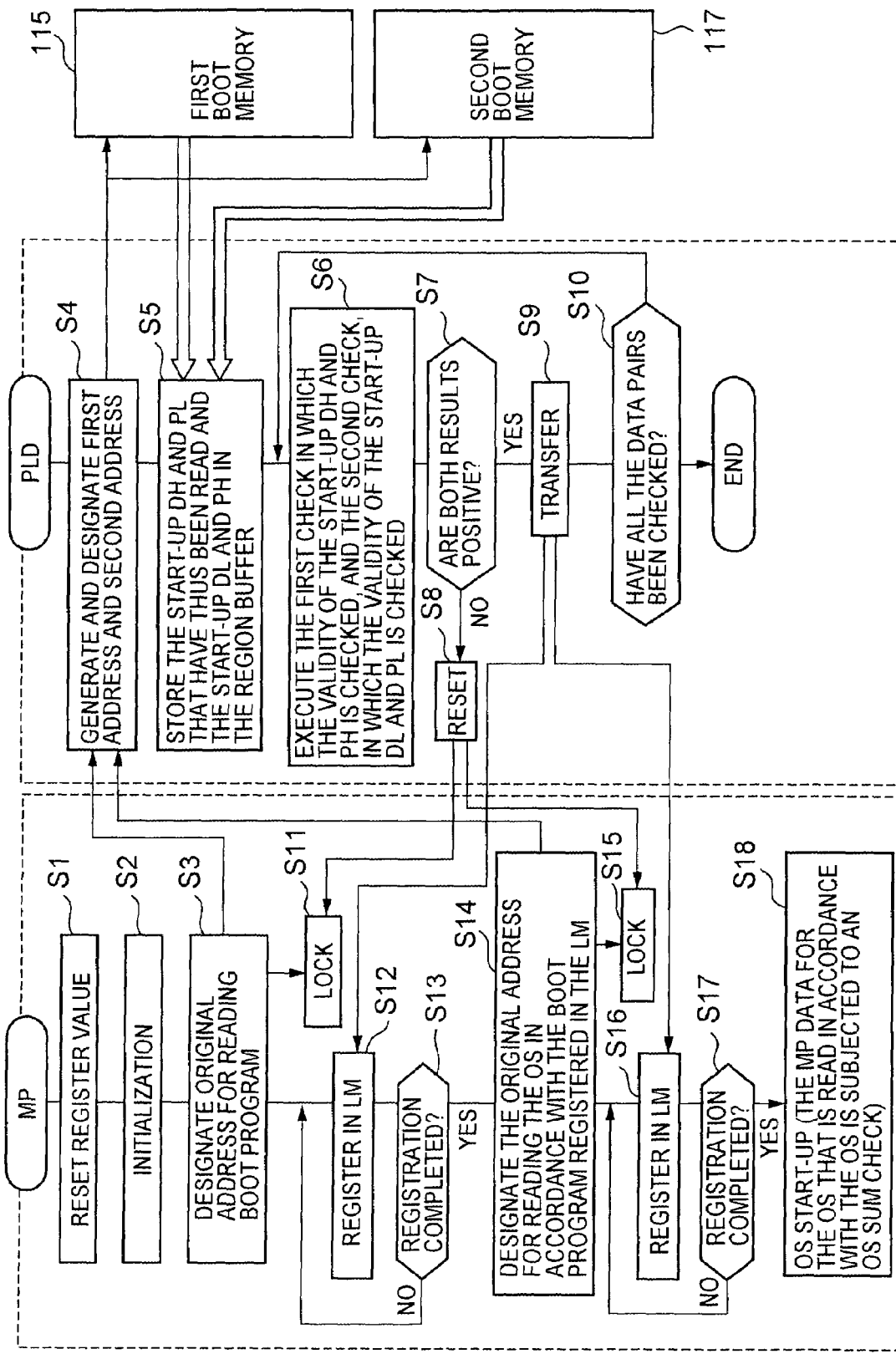
FIG. 4 is a view showing the processing flow performed when start-up MP data is read by the MP 111.

FIG. 4 shows the process flow performed when the MP 111 reads the start-up MP data.

When for example the power of the MP 111 is turned on, the MP 111 resets the value of the register 123 (step S1) and performs initialization of the register 123 (S2). In this way, the original address for reading the start-up MP data is written to the register 123. The MP 111 outputs the original address for reading (for example the original address for reading the boot program) that is written in the register 123 to the PLD 121 (S3).

The original address for reading that is output to the PLD 121 from the MP 111 is accumulated in the address buffer 101. The address conversion circuit 102 generates a first and second address by using the original address for reading in the address buffer 101 and thereby specifies the first address in the first boot memory 115 and the second address in the second boot memory 117 (S4). In this way, the start-up DH and PL that are present in the first address of the first boot memory 115 are read and stored in the buffer 109 and the start-up DL and PH that are present in the second address of the second boot memory 117 are stored in the read buffer 109 (S5).

The data checking circuit 107 checks the validity (i.e. performs a first check) of the start-up DH by using the start-up most significant protection code included in the PH in the read buffer 109 and checks the validity (i.e. performs a second check) of the start-up DL using the start-up least significant protection code included in the PL (S7).

If a negative check result is obtained (N in S7) in at least one of the first check and second check, the data checking circuit 107 performs prescribed error processing to arrange that neither of the start-up DH and PL or start-up DL and PH are output to the MP 111 and resets (S8) the MP 111 using for example the reset signal line 6. In this way, the MP 111 is locked (S1).

If, in S7, the data checking circuit 107 obtained a positive check result in respect of both of the first check and the second check (Y in S7), the start-up DH and PL and the start-up DL and PH in the read buffer 109 are transferred to the MP 111 (S9). In other words, the data checking circuit 107 allows reading of the start-up DH and PL and the start-up DL and PH to the MP 111.

The processing of S6 to S9 is performed for all of the start-up DH and PL and start-up DL and PH in respect of the boot program (N in S10).

When the start-up DH and PL and start-up DL and PH are read through the PLD 121, the MP 111 expands (S12) this start-up DH and PL and start-up DL and PH that have thus been read into the local memory 159.

If all of the start-up DH and PL and start-up DL and PH have been registered in the local memory 159 (Y in S13) in respect of the boot program i.e. if the boot program has been properly written to the local memory 159, the MP 111 outputs (S14) the original address for reading for reading the OS, in accordance with this boot program. In this way, the processing of S4 to S10 described above is performed. That is, if spurious code was included in the OS that is read from the boot memory 115, 117, the MP 111 is blocked (S15) in accordance with the reset signal from the PLD 121 but, otherwise, the OS of the MP 111 is started up (Y in S16 and S17, S18) by expansion of the OS in the local memory 159.

It should be noted that, when the OS is started up, if for example the expected value of the checksum in respect of the MP data for the OS of the OS that is employed is stored in the file spaces 115F and 117F, the OS of the MP 111 may perform a sum check in respect of the MP data for the OS. In other words, prior to starting up the MP 111, a hardware check is performed on the MP data that is read by the MP 111 and after starting up of the MP 111 a software check can be performed by the OS on the MP data that is read by the MP 111.

Figure 5:
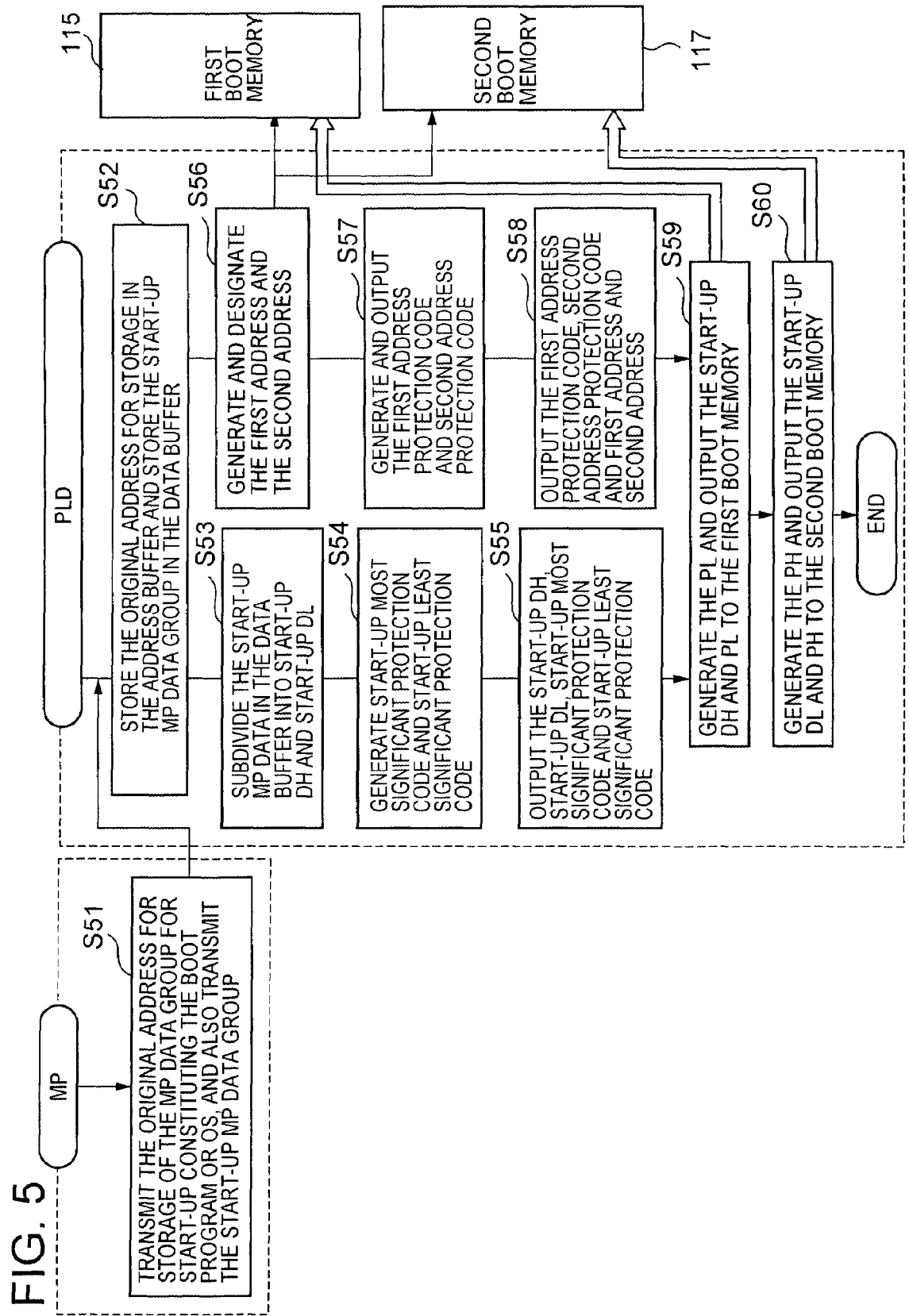
FIG. 5 is a view showing the processing flow when start-up MP data is written by the MP 111.

FIG. 5 shows the flow of the processing that is performed when writing the start-up MP data by the MP 111.

The MP 111 transmits (S51) the original address for storage of the group of start-up MP data constituting the boot program or OS, and also the group of these start-up MP data, to the PLD 121.

The group of start-up MP data that is transmitted from the MP 111 to the PLD 121 is accumulated on the data buffer 103.

The sub-division protection generating circuit 119 subdivides (S53) the respective groups of start-up MP data in the data buffer 103 into start-up DHs and start-up DLs. Also, the sub-division protection generating circuit 119 generates (S54) start-up most significant protection code based on the start-up DHs obtained by this sub-division process and generates start-up least significant protection code based on the start-up DLs obtained by the sub-division process. The sub-division protection generating circuit 119 generates and outputs (S55) the start-up DHs, start-up DLs, start-up most significant protection code and start-up least significant protection code.

The original address for storage that is transmitted from the MP 111 to the PLD 121 is accumulated in the address buffer 101. The address conversion circuit 102 generates the first and second address based on the original address for storage in the address buffer 101 and designates the first address in the first boot memory 115 and designates the second address in the second boot memory 117 (S56). Also, the address conversion circuit 102 outputs the first address and the second address to the address protection code generating circuit 105.

The address protection code generating circuit 105 generates first address protection code based on the first address from the address conversion circuit 102 and generates second address protection code based on the second address (S57). The address protection code generating circuit 105 outputs the first address protection code and the second address protection code that are thus generated and the first address and second address from the address conversion circuit 102 (S58).

The coupling circuit 251 generates a PL by coupling the second address protection code from the address protection code generating circuit 105 and the second address and start-up least significant protection code, and writes (S59) this PL together with the start-up DH selected from the start-up DHs and start-up DLs from the sub-division protection generating circuit 119 in the first boot memory 115 through the first data line 4A. Also, the coupling circuit 251 generates a PH by coupling the first address protection code from the address protection code generating circuit 105 and the first address and start-up most significant protection code, and writes (S60) this PH together with the start-up DL selected from the start-up DHs and start-up DLs from the-sub-division protection generating circuit 119 in the second boot memory 117 through the second data line 4B.

As described above, in this embodiment, a PLD 121 is interposed on the communication route between the MP 111 and the boot memories 115, 117. The boot memories 115 and 117 store start-up MP data and protection code thereof. When the start-up MP data and the protection code thereof for starting up the MP 111 are output from the boot memories 115 and 117, the PLD 121 performs, in hardware fashion, a check of the validity of the start-up MP data using the protection code thereof. If the result is that a negative check result is obtained, the PLD 121 does not output the start-up MP data to the MP 111. In this way, the inconvenience of for example hang-up of the MP 111 due to its being operated using spurious data codes can be prevented since, even without starting up the MP 111, a check of the validity of the MP data requested by the MP 111 is performed and, if there is a possibility that spurious data codes are present in this MP data, the MP 111 is not allowed to read this MP data.

Also, in the embodiment described above, the start-up DHs and start-up DLs constituting the MP data are stored in separate boot memories 115, 117, the PH, including the protection code of the start-up DHs, is stored in the second boot memory 117 where the start-up DLs are stored and the PLs, including the protection codes of the start-up DLs, are stored in the first boot memory 119 where the start-up DHs are stored. In other words, a given boot memory does not store the protection codes for given MP elements of the start-up MP data but rather the protection codes for the other MP data elements. Consequently, if, for example, due to some cause such as occurrence of a fault in the second boot memory 117, the start-up DLs and PHs contain spurious codes (for example, all the constituent codes have become zero), a negative check result will be obtained on checking the validity of the start-up DHs using these PHs, so, if the validity of abnormal start-up DLs is checked using normal PLs, a negative check result will be obtained, resulting in a decision that not merely the start-up DLs and PHs are abnormal but also the start-up DHs and PLs. The certainty of preventing the MP 111 from reading abnormal data can thereby be increased.

Also, with the embodiment described above, the memory spaces of the boot memories 115, 117 can be classified in accordance with the nature of the data stored therein. For example, the boot memories 115, 117 can be classified into direct execution spaces 115B, 117B in which start-up MP data is stored and file spaces 115F, 117F, in which OS data employed after start-up is stored. In this way, the data that is read by the MP 111 can be checked by different methods depending on the type of space.

Various modified examples of the embodiment described above may be envisioned. These modified examples are described below. It should be noted that the description will concentrate on the points of difference with respect to the embodiment described above and overlapping description will be eliminated or simplified.

(1) FIRST MODIFIED EXAMPLE

Figure 6:
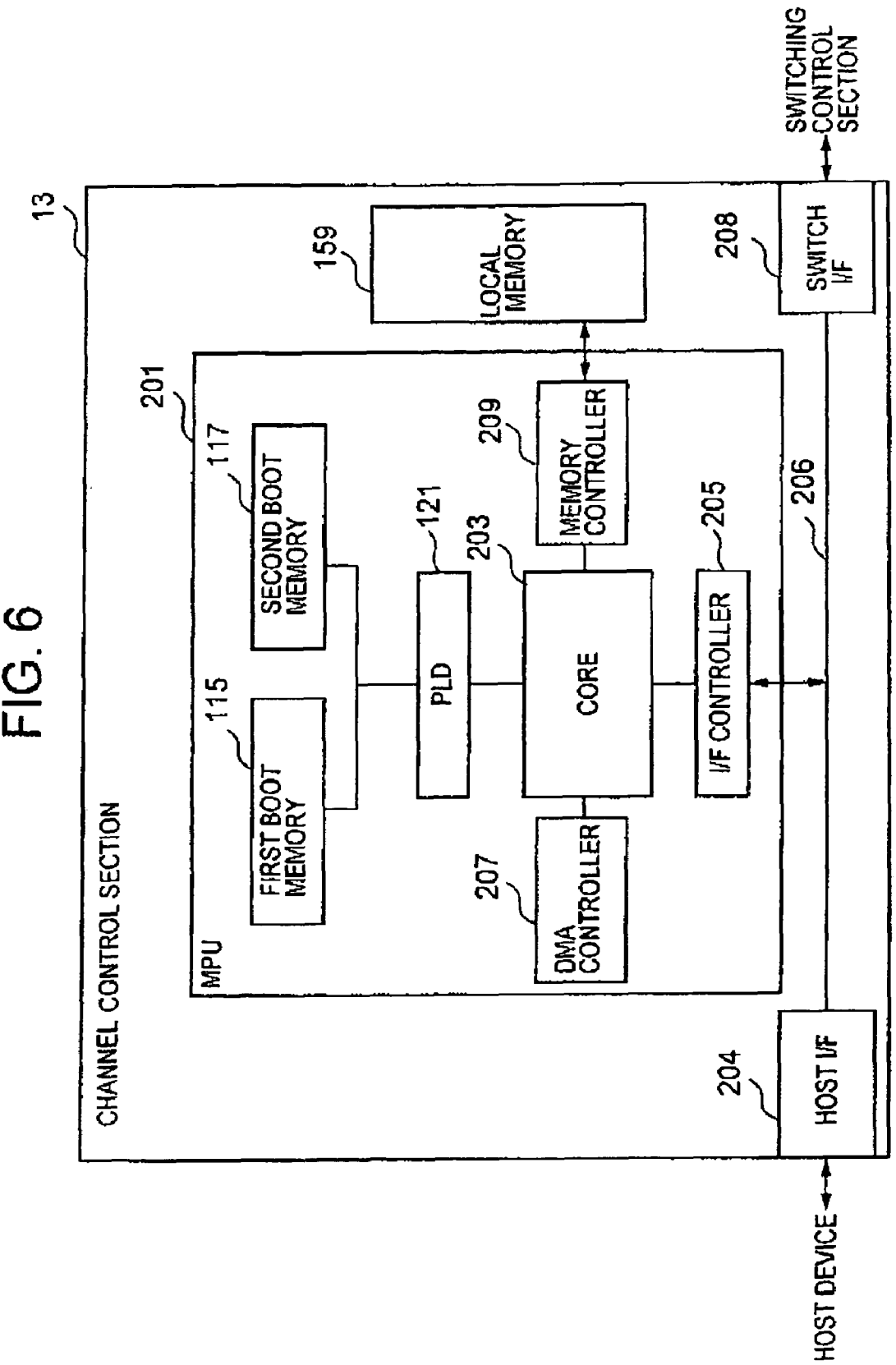
FIG. 6 is a view showing a channel control section according to a first modified example of an embodiment of the present invention.

FIG. 6 shows a channel control section according to a first modified example of the embodiment of the present invention.

The channel control section 13 comprises for example a microprocessor unit (hereinbelow called MPU) 201, a local memory 159, a host interface circuit (hereinbelow called host I/F) 204 connected with the host device 1 and a switch interface circuit (hereinbelow called switch I/F) 208 connected with a switching control section 21. The MPU 201 comprises a processor core 203, a first boot memory 115 and second boot memory 117 that store for example start-up MP data read by the processor core 203, and a PLD 121 interposed on the communication route of the processor core 203 and boot memories 115, 117. Also, the MPU 201 comprises a DMA controller 207 that controls direct memory access, a memory controller 209 that controls access by the processor core 203 in respect of the local memory 159 and an I/F controller that controls communication of the processor core 203 and a device that is outside the MPU 201 through a PCI bus 206. The processor core 203 starts up when it reads the OS from the boot memories 115, 117. The boot memories 115, 117 may be SRAM or DRAM.

In this first modified example, as shown in FIG. 6, a system like that of the boot control system described above is mounted on the single chip of the MPU 201. In this way, a reduction in the number of components required for constructing the boot control system can be achieved.

It should be noted that although the drawings show an example in which the MPU 201 was incorporated in the channel control sections 13, the MPU 201 could also be incorporated in the disc control sections 19.

(2) SECOND MODIFIED EXAMPLE

FIG. 7 is a view given in explanation of a second modified example of the embodiment of the present invention.

A boot control system 123 is incorporated in the channel control sections 13 (or disc control sections 19). An SVP 12 is connected through a communication network such as a LAN with the MP 111 in the boot control system 123.

The SVP 12 monitors the various MPs on the channel control sections 13 on each disc control section 19 (for example, monitoring is performed by periodically sending signals to each MP and monitoring whether or not a prescribed response signal is returned). If the SVP 12 cannot detect an MP that ought to have started up (for example if no response signal has been returned from the MP that ought to have started up), for example as shown in FIG. 7, a message to the effect that this MP has not started up and a message proposing re-installation of the program or OS are displayed on the display screen.

While a preferred embodiment and various modified examples of the present invention were described above, these merely constitute examples given in explanation of the present invention and the scope of the present invention is not be regarded as limited to this embodiment and modified examples. The present invention could be put into practice in various other modes.

What is claimed is:

1. A storage control system connected to an external device, comprising:
    a plurality of storage devices that store data;
    a cache memory that temporarily stores data that is exchanged between said storage devices and said external device;
    and a control device that controls the exchange of data performed between said storage devices and said external device through said cache memory;
    wherein said control device comprises:
    a processor that controls said exchange;
    a start-up memory region that stores start-up data required for starting up said processor and protection data including start-up protection code constituting protection code for said start-up data; and
    data checking hardware;
    wherein:
    said start-up data includes a start-up data most significant element constituting the element on the most significant side of said start-up data, and a start up-data least significant element constituting the element on the least significant side of said start-up data;
    said protection data includes most significant protection data constituting the element on the most significant side of said protection data, and least significant protection data constituting the element on the least significant side of said protection data;
    said start-up protection code includes start-up most significant protection code constituting the protection code of the most significant element of said start-up data, and start-up least significant protection code constituting the protection code of the least significant element of said start-up data;
    said start-up memory region comprises a first start-up sub-memory region and a second start-up sub-memory region;
    said first start-up sub-memory region stores said start-up data most significant element and said least significant protection data;
    said least significant protection data includes a second address representing an address in said second start-up sub-memory region, a second address protection code constituting the protection code of the second address, and said start-up data least significant element;
    said second start-up sub-memory region stores said start-up data least significant element and said most significant protection data;
    said most significant protection data includes a first address representing an address in said first start-up sub-memory region, a first address protection code constituting the protection code of the first address, and said start-up data most significant element;
    said data checking hardware;
    reads said least significant protection data and said start-up data most significant element from said first start-up sub-memory region;
    reads said most significant protection data and said start-up data least significant element from said second start-up sub-memory region;
    performs a first sub-check that checks the validity of said start-up data most significant element by using said start-up most significant protection code in said most significant protection data, and a second sub-check that checks the validity of said start-up data least significant element by using said start-up least significant protection code in said least significant protection data; and
    if a negative check result is obtained in at least one of said first sub-check and said second sub-check, resets said processor and, if a positive check result is obtained in both of said first sub-check and said second sub-check, inputs said start-up data most significant element and said start-up data least significant element to said processor.

2. The storage control system according to claim 1, wherein:
    said data checking hardware comprises:

an address generating circuit that generates said first address and said second address based on an original address;

an address protection code generating circuit that generates said first address protection code based on said first address and said second address protection code based on said second address;

a subdividing circuit that subdivides the start-up data received from said processor into said start-up data most significant elements and said start-up data least significant elements;

a protection code generating circuit that generates said start-up most significant protection code using said start-up data most significant elements and generates said start-up least significant protection code using said start-up data least significant elements;

a protection data generating circuit that generates said most significant protection data including said first address protection code, said first address, and said start-up data most significant elements, and least significant protection data including said second address protection code, said second address and said start-up data least significant elements, and a data storage circuit that stores said start-up data most significant elements and said least significant protection data in said first start-up sub-memory regions and that stores said start-up data least significant elements and said most significant protection data in said second start-up sub-memory region.

3. A boot control system comprising:

a processor;

start-up memory regions that store start-up data required for starting up said processor and start-up protection code constituting protection code for said start-up data; and data checking hardware;

wherein:

said start-up data includes a start-up data most significant element constituting the element on the most significant side of said start-up data, and a start-up data least significant element constituting the element on the least significant side of said start-up data;

said protection data includes most significant protection data constituting the element on the most significant side of said protection data, and least significant protection data constituting the element on the least significant side of said protection data;

said start-up protection code includes start-up most significant protection code constituting the protection code of the most significant element of said start-up data, and start-up least significant protection code constituting the protection code of the least significant element of said start-up data;

said start-up memory region comprises a first start-up sub-memory region and a second start-up sub-memory region;

said first start-up sub-memory region stores said start-up data most significant element and said least significant protection data;

said least significant protection data includes a second address representing an address in said second start-up sub-memory region, a second address protection code constituting the protection code of the second address, and said start-up data least significant element;

said second start-up sub-memory region stores said start-up data least significant element and said most significant protection data;

said most significant protection data includes a first address representing an address in said first start-up sub-memory region, a first address protection code constituting the protection code of the first address, and said start-up data most significant element;

said data checking hardware:

reads said least significant protection data and said start-up data most significant element from said first start-up sub-memory region;

reads said most significant protection data and said start-up data least significant element from said second start-up sub-memory region;

performs a first sub-check that checks the validity of said start-up data most significant element by using said start-up most significant protection code in said most significant protection data, and a second sub-check that checks the validity of said start-up data least significant element by using said start-up least significant protection code in said least significant protection data; and if a negative check result is obtained in at least one of said first sub-check and said second sub-check, resets said processor and, if a positive check result is obtained in both of said first sub-check and said second sub-check, inputs said start-up data most significant element and said start-up data least significant element to said processor.

4. The boot control system according to claim 3, wherein:

said data checking hardware comprises:

an address generating circuit that generates said first address and said second address based on an original address;

an address protection code generating circuit that generates said first address protection code based on said first address and said second address protection code based on said second address;

a subdividing circuit that subdivides the start-up data received from said processor into said start-up data most significant elements and said start-up data least significant elements;

a protection code generating circuit that generates said start-up most significant protection code using said start-up data most significant elements and generates said start-up least significant protection code using said start-up data least significant elements;

a protection data generating circuit that generates said most significant protection data including said first address protection code, said first address, and said start-up data most significant elements, and least significant protection data including said second address protection code, said second address, and said start-up data least significant elements; and a data storage circuit that stores said start-up data most significant elements and said least significant protection data in said first start-up sub-memory region, and that stores said start-up data least significant elements and said most significant protection data in said second start-up sub-memory region.

5. A processor chip, comprising:

a processor core;

a start-up memory region that stores the start-up data required for starting up said processor core and start-up protection code constituting protection code for said start-up data; and data checking hardware;

wherein:

said start-up data includes a start-up data most significant element constituting the element on the most significant side of said start-up data, and a start-up data least significant element constituting the element on the least significant side of said start-up data;

said protection data includes most significant protection data constituting the element on the mast significant side of said protection data, and least significant protection data constituting the element on the least significant side of said protection data;

said start-up protection code includes start-up most significant protection code constituting the protection code of the most significant element of said start-up data, and start-up least significant protection code constituting the protection code of the least significant element of said start-up data;

said start-up memory region comprises a first start-up sub-memory region and a second start-up memory region;

said first start-up memory region stores said start-up data most significant element and said least significant protection data;

said least significant protection data includes a second address representing an address in said second start-up sub-memory region, a second address protection code constituting the protection code of the second address, and said start-up data least significant element;

said second start-up sub-memory region stores said start-up data least significant element and said most significant protection data;

said most significant protection data includes a first address representing an address in said first start-up sub-memory region, a first address protection code constituting the protection code of the first address, and said start-up data most significant element;

said data checking hardware:

reads said least significant protection data and said start-up data most significant element from said first start-up sub-memory region;

reads said most significant protection data and said start-up data least significant element from said second start-up sub-memory region;

performs a first sub-check that checks the validity of said start-up data most significant element by using said start-up most significant protection code in said most significant protection data, and a second sub-check that checks the validity of said start-up data least significant element by using said start-up least significant protection code in said least significant protection data; and if a negative check result Is obtained in at least one of said first sub-check and said second sub-check resets said processor and, if a positive check result is obtained in both of said first sub-check and said second sub-check, inputs said start-up data most significant element and said start-up data least significant element to said processor core.

6. A storage control system comprising:

a processor;

a memory region that stores start-up data required for starting up said processor and protection data; and data checking hardware;

wherein:

said start-up data includes a first start-up data element and a second start-up data element;

said protection data includes a first protection data element and a second protection data element;

said memory region comprises a first sub-memory region and a second sub-memory region;

said first sub-memory region stores said first start-up data element and said second protection data element for protecting said second start-up data element and a second address representing an address in said second sub-memory region;

said second sub-memory region stores said second start-up data element and a first protection data element for protecting said first start-up data element and a first address representing an address in said first sub-memory region;

said data check hardware:

reads said first start-up data element and said second protection data element from said first memory area, reads said second start-up data element and said first protection data element from said second memory area, performs a first sub-check that checks the validity of said first start-up data element by using said first protection data element, and a second sub-check that checks the validity of said second start-up data element by using said second protection data element, if a negative check result is obtained in at least one of said first sub-check and said second sub-check resets said processor and, if a positive check result is obtained in both of said first sub-check and said second sub-check, inputs said first start-up data element and said second start-up data element to said processor.

* * * * *